(12) United States Patent
Keller

(10) Patent No.: US 12,196,238 B2
(45) Date of Patent: *Jan. 14, 2025

(54) QUICK DETACH SHOOTING STICK

(71) Applicant: Swagger, LLC, Grand Island, NE (US)

(72) Inventor: Aaron Keller, Grand Island, NE (US)

(73) Assignee: Swagger, LLC, Grand Island, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/504,155

(22) Filed: Oct. 18, 2021

(65) Prior Publication Data
US 2022/0034339 A1    Feb. 3, 2022

Related U.S. Application Data

(63) Continuation-in-part of application No. 16/536,898, filed on Aug. 9, 2019, now Pat. No. 11,150,046.

(60) Provisional application No. 62/760,579, filed on Nov. 13, 2018, provisional application No. 62/717,166, filed on Aug. 10, 2018.

(51) Int. Cl.
  *F41A 23/10* (2006.01)
  *F16B 2/02* (2006.01)
  *F41A 23/08* (2006.01)

(52) U.S. Cl.
  CPC ............... *F16B 2/02* (2013.01); *F41A 23/08* (2013.01)

(58) Field of Classification Search
  CPC ........ F41A 23/10; F16M 11/16; F16M 11/041
  USPC ............................................. 42/94; 89/37.04
  See application file for complete search history.

(56) References Cited

U.S. PATENT DOCUMENTS

| | | |
|---|---|---|
| 5,194,678 A | 3/1993 | Kramer |
| 5,815,974 A | 10/1998 | Keng |
| 7,222,451 B2 | 5/2007 | Keng et al. |
| 7,571,563 B2 | 8/2009 | Peterson et al. |
| 7,631,455 B2 | 12/2009 | Keng et al. |
| 7,676,979 B1 | 3/2010 | Mertz |
| 8,104,213 B2 | 1/2012 | Keng et al. |
| 10,317,163 B2 | 6/2019 | Poindextex et al. |
| 10,408,555 B2 | 9/2019 | Flood, Jr. et al. |
| 2009/0038200 A1 | 2/2009 | Keng |
| 2010/0269393 A1 | 10/2010 | Bean |
| 2010/0307046 A1 | 12/2010 | Cheng |
| 2012/0085012 A1 | 4/2012 | Potterfield et al. |
| 2014/0190060 A1 | 7/2014 | Sherman |
| 2016/0209172 A1 | 7/2016 | Trotabas |
| 2016/0238336 A1 | 8/2016 | Bartak |
| 2016/0273863 A1 | 9/2016 | Kyle |
| 2017/0167817 A1 | 6/2017 | Kyle |
| 2018/0058794 A1 | 3/2018 | Scalf |
| 2018/0180375 A1 | 6/2018 | Macken et al. |
| 2019/0093976 A1 | 3/2019 | Power |

*Primary Examiner* — Bradley Duckworth
(74) *Attorney, Agent, or Firm* — Braxton Perrone, PLLC; Bobby W. Braxton; Gregory Perrone (57) ABSTRACT

A system and method for a quick detach shooting stick. The system includes a body coupled to at least one leg via a flexible joint. The body has a recess and a lip disposed within the recess. The body has a release switch which is coupled to a stopper. The body can be coupled to an adaptor which has a groove to match the lip and a void which matches the stopper. The adaptor slides into an open side of the adaptor and is engaged with the groove. The adaptor is locked in place via the stopper.

7 Claims, 8 Drawing Sheets

QUICK DETACH SHOOTING STICK

PRIORITY

The present invention is a continuation application of U.S. application Ser. No. 16/536,898 filed Aug. 9, 2019, which claims priority to U.S. 62/717,166 filed Aug. 10, 2018 and U.S. 62/760,579 filed Nov. 13, 2018, the entirety of both of which is hereby incorporated by reference.

BACKGROUND OF THE INVENTION

Technical Field

The present invention relates to a system and method for using a quick-detach shooting stick.

Description of Related Art

Shooting sticks are useful to allow a shooter balance and additional support. However, shooting sticks are often bulky and difficult to carry. Consequently, there is a need for an improved shooting stick.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
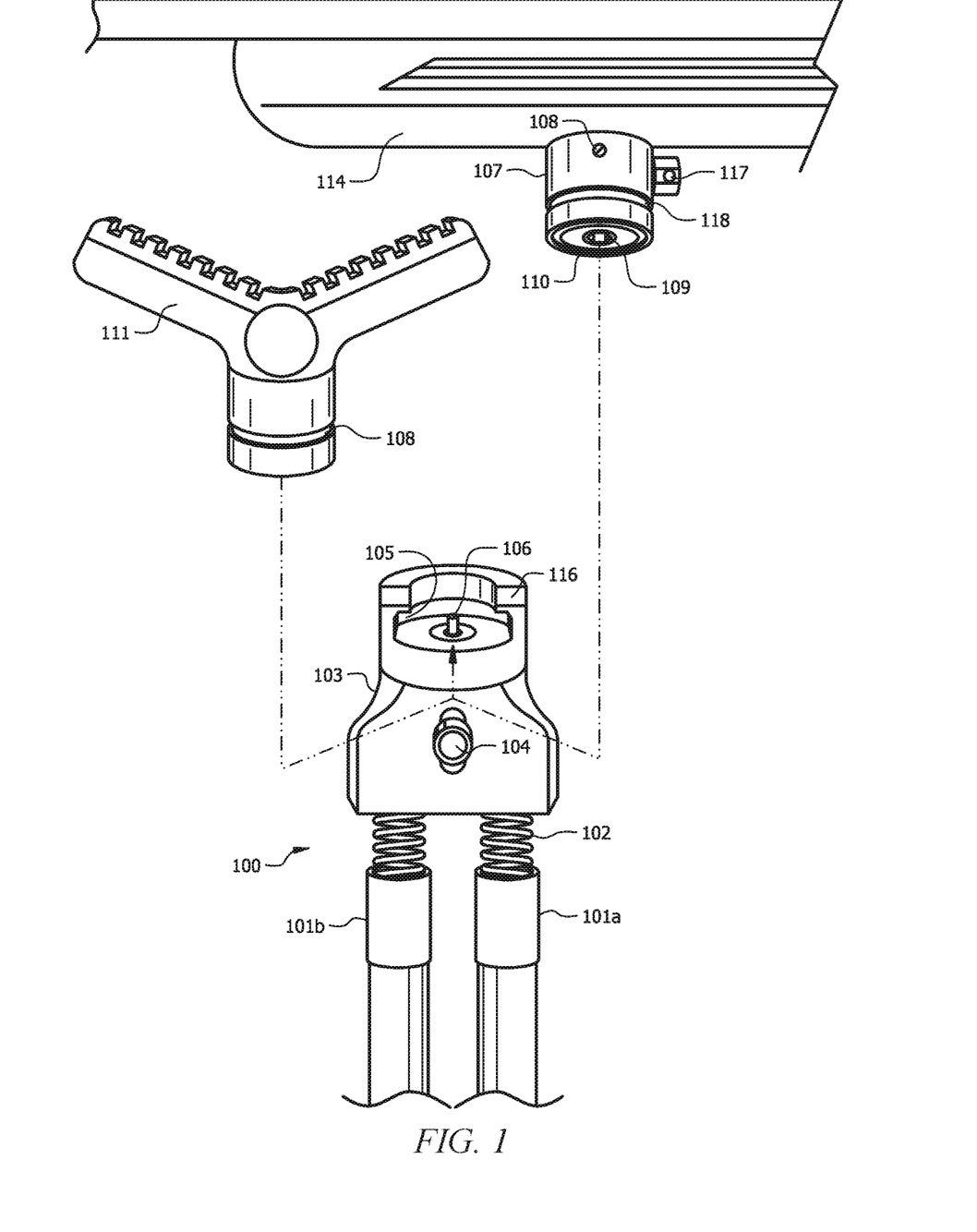
FIG. 1 is a perspective view of a quick detach shooting stick system in one embodiment.

FIG. 1 is a perspective view of a quick detach shooting stick system in one embodiment. These various components will be discussed in greater detail below herein.

In one embodiment, the shooting stick system is removeably coupled to a firearm. As depicted, the firearm is a rifle with a rifle stock 114. The firearm can also be a shotgun, crossbow, or an optical instrument such as a monocular. Thus, while a rifle has been described, this is for illustrative purposes only and should not be deemed limiting. The shooting stick can be used on virtually any firearm including rifles, shotguns, handguns, etc. In one embodiment the bipod support can be used for virtually any tool which is used to accurately launch one projectile toward a target.

Furthermore, while the system has been described as a shooting stick, the quick detach system and mechanism can be utilized with any device which uses legs and which would benefit from a quick detach system. This can include bi-pod or tri-pods for cameras, photography, telescopes, etc.

The shooting stick 100 can comprise virtually any material and combinations thereof. The shooting stick 100 can comprise metal, plastic, rubber, wood, and combinations thereof.

As shown the shooting stick 100 comprises a body 103 coupled to at least one leg 101. As depicted, the shooting stick 100 comprises two legs: 101a, 101b. The legs 101 can comprise virtually any length. In one embodiment the length of the legs 101 can be adjusted. In one such embodiment the legs can be telescopically retracted and extended.

As noted, while two legs are shown, this is for illustrative purposes only and should not be deemed limiting. In other embodiments the system will comprise a single leg while in still other embodiments the system will comprise more than two legs.

In one embodiment, and as shown, the legs 101 are attached to the body 103 by a flexible joint 102. A flexible joint, as used herein, refers to a coupling which allows the leg to flex and move relative to the flexible joint. In practice, this allows a user to obtain a desired angle and shooting position. The flexing also allows the system to accommodate varying ground elevations, imperfections do to rocks, etc.

The flexible joint 102 can comprise virtually any joint known in the art which allows for such flexing. In one embodiment, and as depicted, the flexible joint 102 comprises a coil spring. While the figures depict a coil, this is for illustrative purposes only and should not be deemed limiting.

Other than coils, the flexible joint can also comprise, for example, a ball and socket joint. In such an embodiment one end is a ball whereas the other adjoining end is a socket, and the ball is allowed to rotate within the socket. The flexible joint can also comprise a rod/piston coupling whereby a rod is allowed to flex relative to an outer piston. In one embodiment hydraulic fluid can be utilized to soften and control the flexing.

In one embodiment the flexible joint allows flexing in more than one dimension. For example, considering a spring, the spring allows flexing in all three dimensions. Thus, in one embodiment the flexible joint allows flexing in all three dimensions. As noted, this helps the user attain a desired angle, position, etc.

While the flexible joint 102 is depicted as being at the top of the leg, this is for illustrative purposes only. The flexible joint can be located virtually anywhere along the leg. In some embodiments, having a flexible joint 102 on the upper end of the leg is an advantage in some embodiments because the lower end is increased, and accordingly often a larger flexing angle can be achieved.

A flexible joint 102 enables angular flexure of the legs 101. The flexible joint 102 has several advantages. As noted, they allow each leg to flex and pivot at the joint. In one embodiment, the flexible joint 102 allow each leg to flex independently. Because the legs can flex, this allows the shooting stick to be mounted on uneven terrain. If for example, a rock was sticking out below the right leg 101b, then the flexible joint 102 allows the right leg 101b to flex inwardly or outwardly as necessary to accommodate the rock. Without the flexible joint 102 the legs would be rigidly fixed at the specified location.

As noted, in one embodiment, and as depicted, the flexible joint 102 comprises a spring coil. The spring coil can comprise any spring known in the art. The diameter, length, and resiliency of the spring coil can be adjusted as necessary. For example, in some embodiments a longer spring coil allow for increased flexing ability.

Turning back to the body 103, the body 103 comprises a release 104 which is coupled to a stopper 106. The release 104 is coupled so that a force upon the release 104 is transferred to the stopper 106. In one embodiment the stopper 106 is pushed in the upward direction by a spring. Pressing downward upon the release 104 counteracts the force of the spring and pushes the stopper 106 downward. In one embodiment the stopper 106 comprises a point such as a detent. The stopper 106 can comprise a circular cross-section such as a detent or a square, rectangular, or other cross-section.

The top of the body 103 comprises a recess 105 and a lip 116. A recess 105 is an absence or void in material allowing the body 103 to receive an object to which it can be coupled. As shown the recess comprises an open top and partially closed sides with an open front wall. As shown, the front wall of the recess is open such that an item such as the adaptor 107 or yolk 111 can be inserted through the opening.

The lip 116 is a protrusion which extends inwardly from the closed side walls. In one embodiment the lip 116 extends perpendicular to the closed side walls.

As depicted, the recess 105 comprises a circular shape. Because the adaptor 107 comprises a circular shape, the recess 105 comprises a circular shape so as to receive the adapter 107. In the recess 105 depicted, the adapter will be inserted and removed through the open front wall. Thus, in one embodiment the open wall on the recess is sufficiently wide to receive the adapter 107.

The recess 105 and lip 116 mate with a similar shape on an adapter 107 or yolk 111. As can be seen, the adapter 107 comprises a groove 118. The groove 118 is an absence of material. As shown, the groove 118 extends around the entire outer perimeter of the adaptor 107. The groove 118 of the adaptor 107 will receive the lip 116 from the shooting stick 100. In this fashion, the two pieces are mated together. The stopper 106 from the body 103, fits within the void 110 on the adaptor 108. As will be described in more detail below, the adapter 107 is mated with the body 103 via the open end. The lip 116 fits within the groove 118, and when the stopper 106 is released via the release 104, the stopper 106 mates with the void 110. The adaptor 107 is thus trapped and positioned within the body 103. The adaptor 107 cannot slide out of the open end of the body 103 because the stopper 106 prevents it from doing so. The adaptor 107 cannot slide upward because of the locking relationship between the lip 116 and the groove 118. It should be noted that while the groove 118 has been described as being located on the adaptor 107 with the lip 116 on the recess, in other embodiments this arrangement is reversed. Specifically, the groove 118 will be on the recess and the lip 116 will be on the adaptor 107.

While an adaptor 107 has been described, this is for illustrative purposes only and should not be deemed limiting. Other tools and accessories can also be mated with the quick detach shooting stick. One example is the yolk 111 depicted in FIG. 1. The yolk 111 can attach and detach from the body 103 as previously described. As shown the yolk 111 comprises a groove 118 which mates with the lip 116 on the body 103. Further, the bottom of the yolk 111 comprises a void 110 which receives the stopper 106. Thus, the yolk 111 can be quickly added and coupled to the shooting stick 100. Later, the yolk 111 can be quickly detached by depressing the release 104.

The yolk 111 provides a stand upon which an object can be balanced. Other accessories can also be mounted to the body 103. These include cameras, survey equipment, etc. Virtually any equipment which can utilize a bipod can be attached to the quick detach system described herein.

Figure 2:
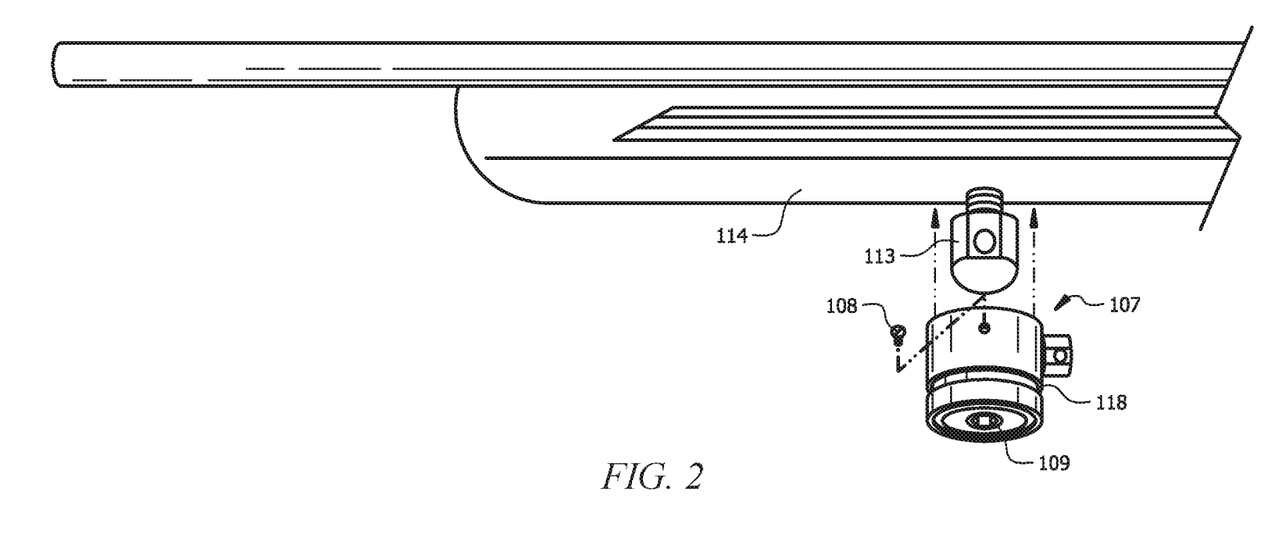
FIG. 2 is a side view of an adaptor in one embodiment.

Turning to FIG. 2, FIG. 2 is a side view of an adaptor in one embodiment. As shown, the stock 114 comprises a swivel stud 113. The adaptor 107 is coupled to the swivel stud 113.

In one embodiment, and as depicted, the adaptor 107 comprises two set screws. The adaptor 107 comprises a horizontal set screw 108 and a vertical set screw 109. To couple the adaptor 107 to the swivel stud 113, the adaptor 107 is placed around the swivel stud 113. Next a first set screw is tightened. In one embodiment the first set screw, the horizontal screw 108 is tightened. This results in a coupling but the adaptor 107 is still somewhat loose. Thus, in one embodiment, a second set screw, in this case the vertical set screw 109, is tightened. This provides two points of contact resulting in a sturdy connection. In one embodiment the first and second set screws are approximately perpendicular to one another.

As noted, the adaptor 107 comprises two set screws. This is an advantage over prior art adaptors which only utilized one set screw but which required other components to enhance the stability. The adaptor 107 discussed herein provides two points of contact located within a single component. This reduces the number of parts and components required to securely couple the adaptor 107 to the swivel stud 113.

It should be noted that while a swivel stud 113 is described, this is for illustrative purposes only and should not be deemed limiting. The adaptor 107 can couple to the stock 114 via any method or device known in the art including a bolt, stud, etc.

Turning briefly back to FIG. 1, the adaptor 107 in FIG. 1 also comprises a supplemental swivel stud 119. Thus, while the swivel stud 113 on the firearm is used to couple to the adaptor 107, the supplemental swivel stud 119 allows all of the benefits and advantages of a swivel stud to be achieved via the supplemental swivel stud 119.

Figure 3:
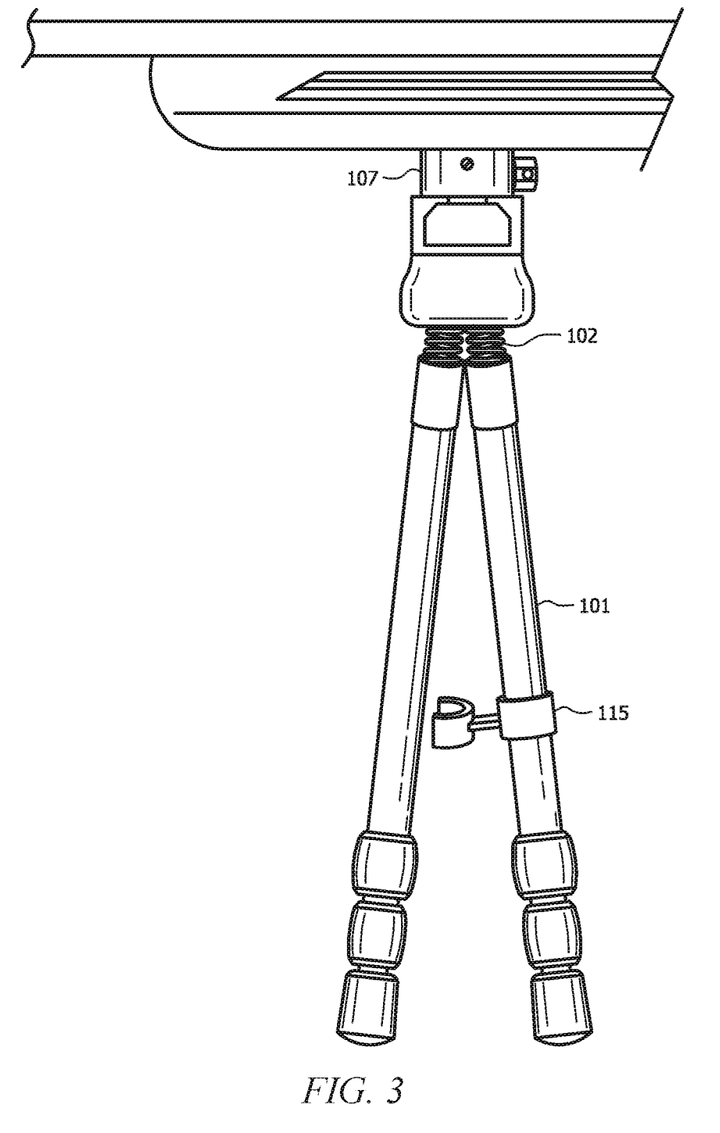
FIG. 3 is a side view of a mounted adaptor in one embodiment.

FIG. 3 is a side view of a mounted adaptor in one embodiment. As can be seen, the shooting stick is coupled to the stock 114 as previously described. The legs 101 can independently flex and bend around each flexible joint 102. In one embodiment, and as depicted in FIG. 3, at least one leg comprises a leg lock 115. This couples both legs together in an adjacent position. When carrying, for example, it is easier to carry the legs if they are a single unit. When deployed, however, the leg lock 115 can be released so that each leg 101 can be independently controlled and adapted.

Figure 4:
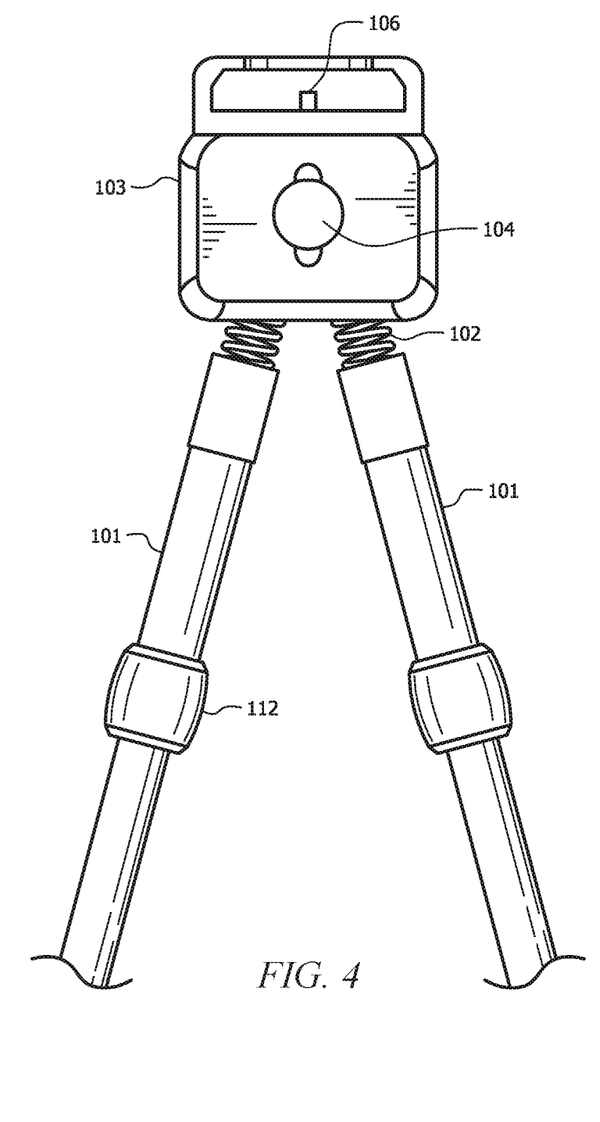
FIG. 4 is a front view of a shooting stick in one embodiment.

FIG. 4 is a front view of a shooting stick in one embodiment. As shown, each leg 101 is flexed independently about each flexible joint 102. As can be seen, the shooting stick does not have a central hinge or pivot. This is contrary to prior designs. This is advantageous because it allows each leg to independently move. If a singular pivot point was utilized, the ability to move and independently position each leg would not be possible.

While an embodiment has been described with a body 103 having an open end and a circular cross-section, this is for illustrative purposes only and should not be deemed limiting. FIGS. 5-10 illustrate another embodiment which has a dissimilar cross-section.

Figure 5:
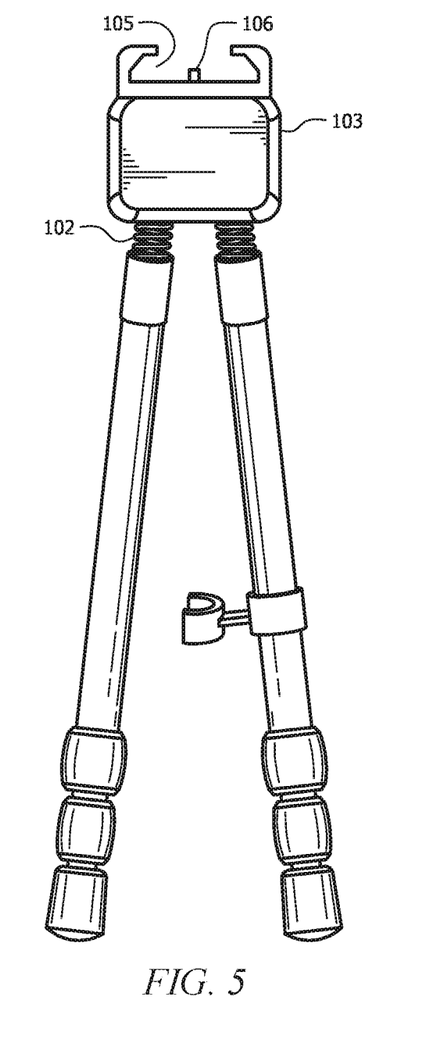
FIG. 5 is a rear perspective view of a shooting stick one embodiment.
Figure 6:
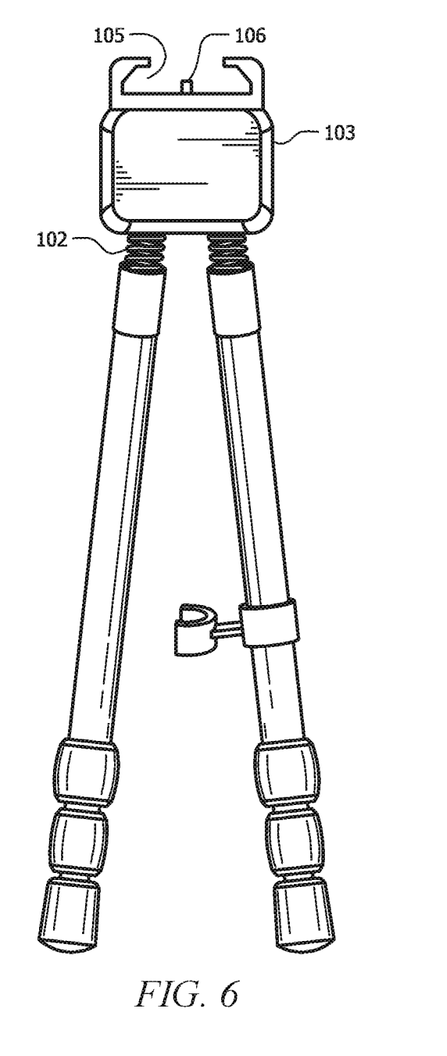
FIG. 6 is a rear perspective view of a shooting stick one embodiment.
Figure 7:
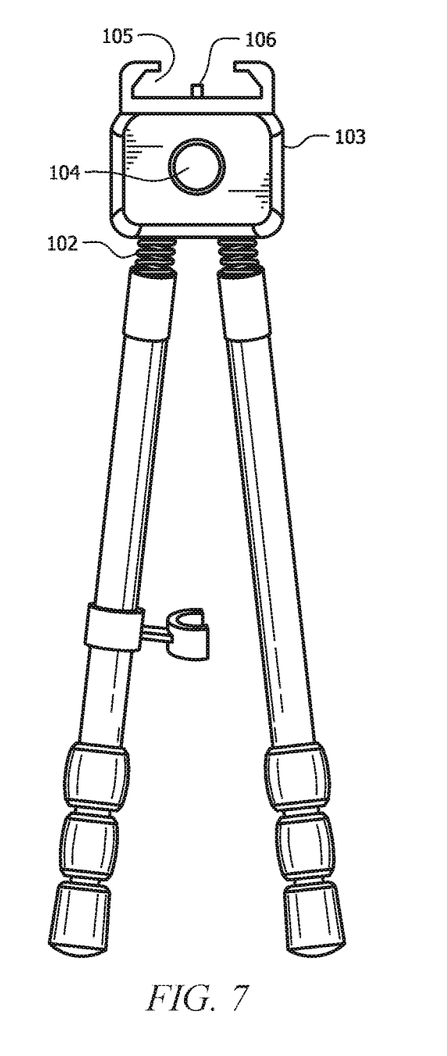
FIG. 7 is a front perspective view of a shooting stick in one embodiment.

FIG. 5 is a rear perspective view of a shooting stick one embodiment. FIG. 6 is an additional review perspective view of a shooting stick in one embodiment. As can be seen, the shooting stick is similar to the shooting stick described in reference to FIG. 1. This is the rear view because the face of the shooting stick, in this view, is facing away from the user. Thus, the front view, depicted in FIG. 7, is what the user is seeing when aiming a firearm attached to the shooting stick.

As shown, the shooting stick has a body 103 and flexible joints 102 as previously described. However, it attaches and couples to an adaptor 107 in a different fashion.

As can be seen the body 103 comprises a recess 105. As depicted, rather than being circular, as in FIG. 1, the recess is tapered. As depicted, the recess 105 has an opening which is greater at the downstream end than the upstream end. In other embodiments the recess 106 has an opening which is greater at the upstream end than the downstream end. As used herein, upstream and downstream refer to relative locations relative to the user when aiming the firearm. A downstream end is the end further from the user whereas the upstream end is the end closest to the user. As shown, the recess 105 tapers from the downstream to the upstream. This allows the recess 105 to be coupled to the adaptor 107 as described in more detail below herein.

The recess 105, as depicted, has an open top, open ends, and enclosed sides and bottom. As shown, the upstream and downstream ends are also open. This allows the recess 105 to be coupled by introducing an extension into either open end on the upstream or downstream end and sliding the body 103 into its desired location. In one embodiment the recess 105 cannot be coupled to the adaptor 107 via the open top. Rather, the recess 105 has to be coupled by sliding the adaptor 107 through the open upstream and downstream ends of the recess 105. In such embodiments, the restrictive top, which is a top through which is more narrow than the adaptor 107, prevents the adaptor 107 from becoming decoupled through the top of the body. In this way, a secure attachment between the adaptor 107 and the recess 105 is achieved, and the only way to get the adaptor 107 decoupled is through the open ends.

The body 103 further comprises a stopper 106. As depicted, the stopper 106 comprises a rectangular shape but this is for illustrative purposes only and should not be deemed limiting. As will be discussed in more detail below, the stopper 106 engages with a void 110 as previously described.

FIG. 7 is a front perspective view of a shooting stick in one embodiment. Thus, this figure depicts the upstream end of the shooting stick. The body comprises a release 104. The release 104 is coupled to the stopper 106. Thus, when the user wants to detach the shooting stick, they depress the release 104. This releases the stopper 106 and allows the body to slide freely away from the adaptor 107.

Figure 8:
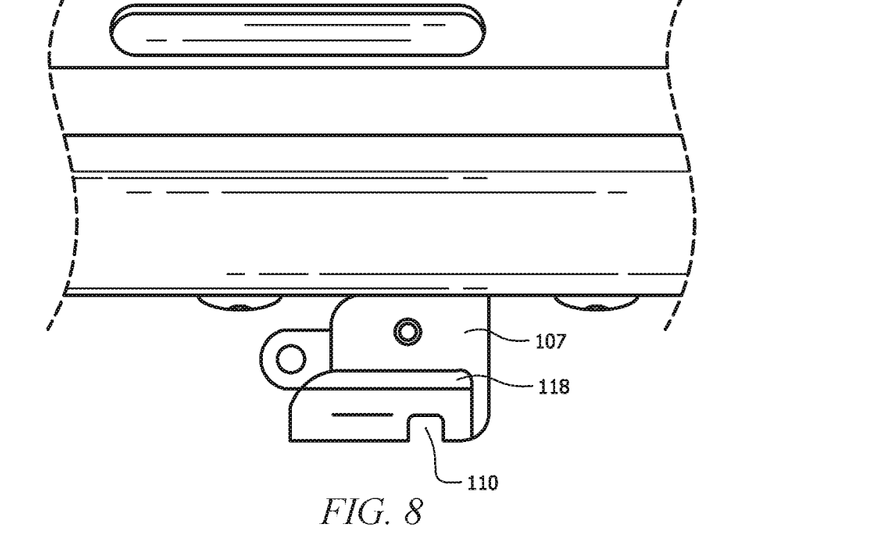
FIG. 8 is a perspective view of an adaptor in one embodiment.

FIG. 8 is a perspective view of an adaptor in one embodiment. The adaptor 107 can function as previously described. It can be attached to a firearm in any way previously described. As depicted, the adaptor 107 is coupled to a picatinny rail system. Thereafter, the shooting stick can be coupled to the adaptor 107 as described.

As shown, the adaptor 107 has grooves 118 which match the recess 105 of the body 103 of the shooting stick. The body 103 can slide upon and engage the grooves 118 of the adaptor. In one embodiment the grooves 118 of the adaptor 107 are tapered as well to match the taper of the recess 105.

The adaptor 107 also comprises a void 110. The void 110 receives the stopper 106. Once received, the body 103 is locked in place relative to the adaptor 107. The body 103 is prevented from sliding away from the adaptor 107 because of the presence of the stopper 106 in the void 110. When the stopper 106 is depressed by the release 104, the body 103 is free to slide relative to the body 103. As stated, this allows the shooting stick to be quickly affixed and detached from the firearm.

As noted, FIG. 8 depicts the adaptor 107 coupled to a picatinny rail system. This is for illustrative purposes only and should not be deemed limiting. The adaptor 107 may be coupled to a firearm via any method or device known in the art.

Figure 9:
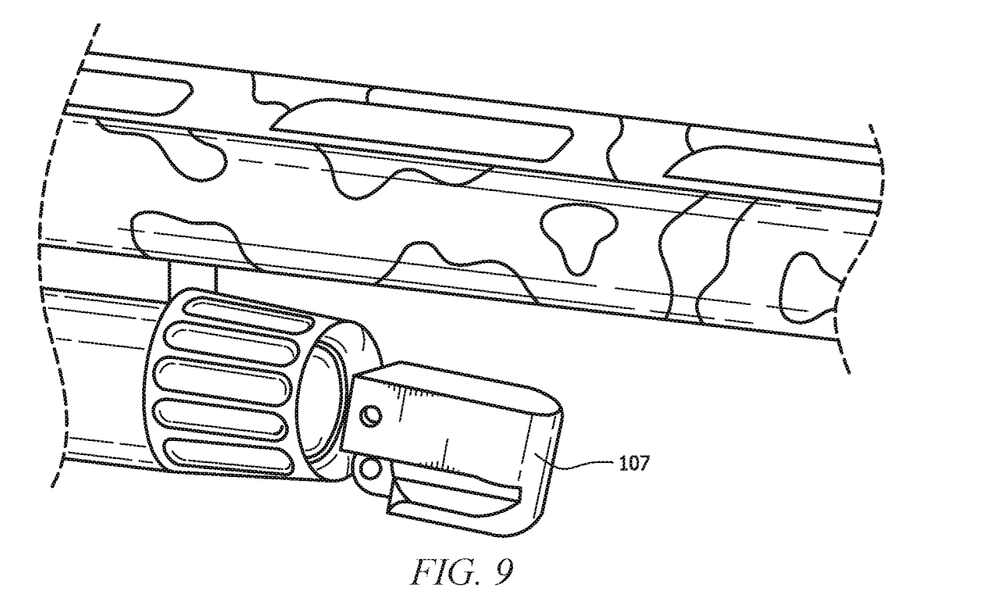
FIG. 9 is a perspective view of an adaptor coupled at the end in one embodiment.

FIG. 9 is a perspective view of an adaptor coupled at the end in one embodiment. In this embodiment, rather than being suspended from above, as in FIG. 7, the adaptor 107 is coupled at the upstream end of the adaptor 107.

Figure 10:
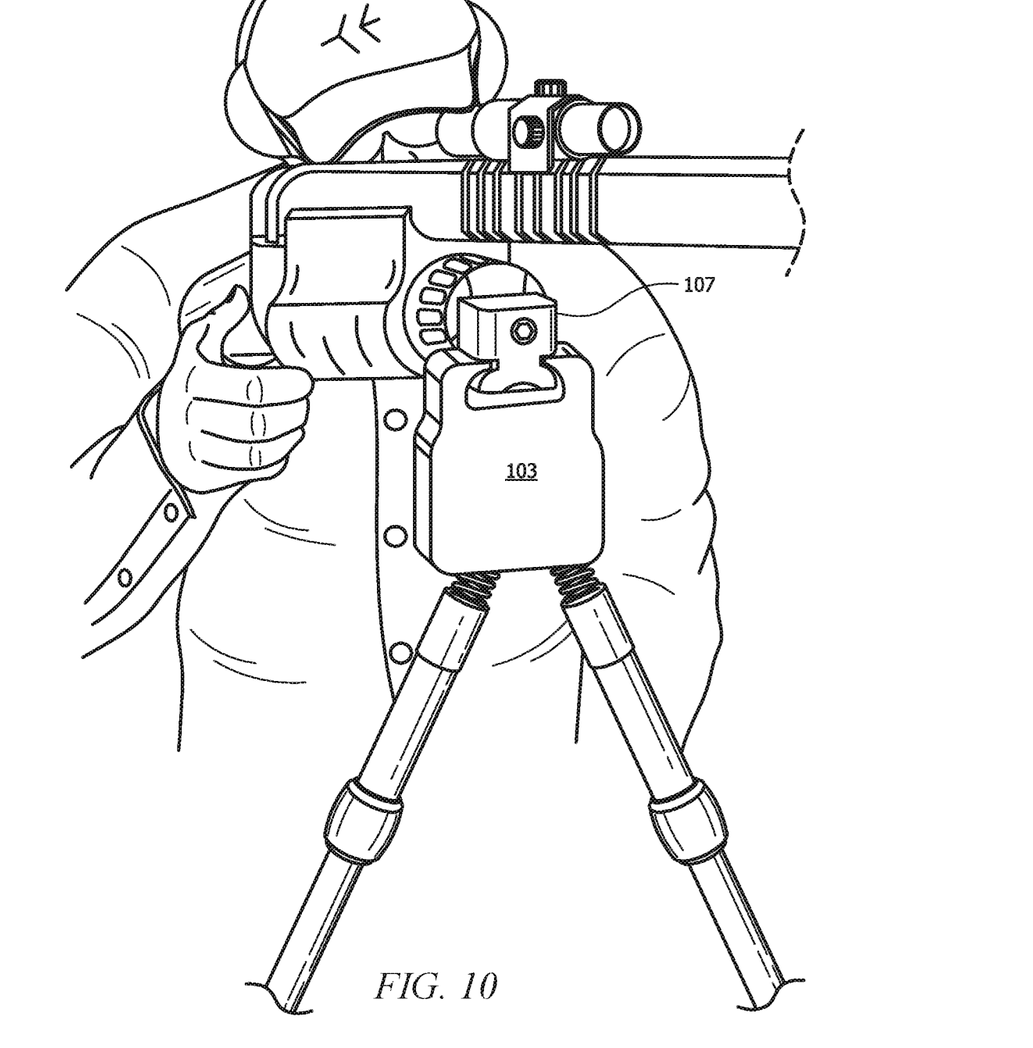
FIG. 10 is the shooting stick coupled to a firearm in one embodiment.

FIG. 10 is the shooting stick coupled to a firearm in one embodiment. As shown, the adaptor 107 is coupled at its upstream end. The adaptor 107 is then coupled to the body 103 of the shooting stick.

The system discussed herein has several advantages. First, the quick detach allows the user to quickly and easily attach or detach the system. As shown, in one embodiment the system and be removed by depressing a single switch, the release 104. Likewise, the system can be installed by simply connecting the body 103 to the adaptor 107.

The ability to quickly attach and detach is significant. Often the system will be utilized by hunters. The opportunity for a shot may be very short-lived so time is premium. A user may position themselves for a shot only to determine that a shooting stick would be preferable. With very little movement or time required, the user can quickly attach and utilize the shooting stick. Additionally, if the user desires to put the shooting stick away, the quick detach allows the shooting sticks to be quickly removed and stowed as desired.

An additional benefit is reduction in the number of parts. As shown, in one embodiment the adaptor 107 simply attaches to the swivel stud 113 without additional parts or components. This is advantageous because all that is required is the adaptor 107 and its accompanying set screws.

A further benefit, as explained above, is the ability of the legs to independently move and position. This was not possible where the legs are joined by a single pivot point. Instead, each leg has an associated flexible joint 102 allowing maximum range and adaptability.

An additional benefit is the versatility in attaching configurations. As noted, the adaptor 107 can be coupled at its top end so that it suspended below the support. This is illustrated in the picatinny rail system of FIG. 8. In other embodiments the adaptor 107 can be secured at it ends as shown in FIGS. 9 and 10. Thus, the adaptor 107 can be coupled to a firearm in many different configurations and orientations.

While the invention has been particularly shown and described with reference to a preferred embodiment, it will be understood by those skilled in the art that various changes in form and detail may be made therein without departing from the spirit and scope of the invention.

What is claimed is:

1. A system for a quick detach stick, said system comprising:

a body coupled to at least one leg via a flexible joint;

wherein said body comprises a recess, wherein said recess is circular in shape and which has a center;

wherein said body comprises a release switch coupled to a stopper, wherein said stopper extends into said recess, and wherein said stopper extends into the center of said circular recess;

wherein said recess is located atop said body, and wherein said recess comprises an open top, side walls, and an open side, and wherein said recess further comprises a lip disposed in said recess on said side wall; and wherein said lip is semi-circular in shape.

2. The system of claim 1 wherein said flexible joint comprises a coil spring.

3. The system of claim 1 further comprising an adaptor which can be coupled to said body via said recess.

4. The system of claim 3 wherein said adaptor comprises a horizontal set screw and a vertical set screw.

5. The system of claim 1 further comprising an adaptor, wherein said adaptor comprises a groove which mates with said lip, and a void which mates with said stopper.

6. The system of claim 5 wherein said void is located on the bottom of said adaptor, and wherein said groove is located along the outer perimeter of said adaptor, and wherein said stopper of said body is received by said void of said adaptor.

7. The system of claim 1 further comprising a yoke which can be coupled to said body via said recess.

\* \* \* \* \*